United States Patent [19]

Judd et al.

[11] Patent Number: 5,612,533
[45] Date of Patent: Mar. 18, 1997

[54] LOW-PROFILE HORIZON-SAMPLING LIGHT SENSOR

[75] Inventors: J. Stephen Judd, Plainsboro, N.J.; Barak P. Pearlmutter, Cambridge, Mass.

[73] Assignee: Siemens Corporate Research, Inc., Princeton, N.J.

[21] Appl. No.: 364,885

[22] Filed: Dec. 27, 1994

[51] Int. Cl.$^6$ .................................................. H01L 27/00
[52] U.S. Cl. .................................. 250/208.1; 250/208.6; 348/36; 348/369
[58] Field of Search .......................... 250/208.1, 208.6, 250/227.11, 227.2; 348/36, 135, 369; 354/94

[56] References Cited

U.S. PATENT DOCUMENTS

| | | | |
|---|---|---|---|
| 4,994,670 | 2/1991 | Noble et al. | 250/235 |
| 5,023,725 | 6/1991 | McCutchen | 358/231 |
| 5,153,716 | 10/1992 | Smith | 358/87 |
| 5,177,685 | 1/1993 | Davis et al. | 364/443 |
| 5,212,643 | 5/1993 | Yoshida | 364/449 |
| 5,262,775 | 11/1993 | Tamai et al. | 340/995 |
| 5,262,852 | 11/1993 | Eouzan et al. | 358/87 |
| 5,283,575 | 2/1994 | Kao et al. | 340/990 |
| 5,291,412 | 3/1994 | Tamai et al. | 364/449 |
| 5,291,413 | 3/1994 | Tamai et al. | 364/449 |
| 5,291,414 | 3/1994 | Tamai et al. | 364/449 |
| 5,303,159 | 4/1994 | Tamai et al. | 364/449 |
| 5,311,434 | 5/1994 | Tamai | 364/449 |

OTHER PUBLICATIONS

Zhang et al., "Segment–Based Matching For Visual Navigation", Computer and Information Science, University of Massachusetts at Amherst, COINS TR91–35, pp. 1–37 (Apr. 1991).

Oh et al., "A Study of the Characteristics of an omnidirectional vision sensor", Advances in Image Processing, SPIE vol. 804, pp. 259–268 (1987).

Zheng et al., "Panoramic Representation for Route Recognition by a Mobile Robot", International Journal of Computer Vision, 9:1, pp. 55–76 (1992).

Hong et al., "Image–Based Navigation Using 360° Views", Proc. of Image Understanding Workshop, pp. 782–791 (1990).

Oh et al., "Guidance of a Mobile Robot Using an Omnidirectional Vision Navigation System", Mobile Robots II, SPIE vol. 852, pp. 288–300 (1987).

Yagi et al., "Panorama Scene Analysis with Conic Projection", IEEE International Workshop on Intelligent Robots and Systems, IROS, pp. 181–187 (1990).

*Primary Examiner*—Edward P. Westin
*Assistant Examiner*—Stephen Calogero
*Attorney, Agent, or Firm*—Adel A. Ahmed

[57] ABSTRACT

An omnidirectional light sensor is provided in a disk-like housing including a plurality of successive spaced apart individual radially directed capsules, each including a lens in a frontmost opening on a side edge of the housing, for focussing light rays from surrounding scenery into the interior of the capsule. A prism or reflecting mirror in each capsule receives the focussed light rays for directing them onto an associated photosensor located radially inward in the capsule, for converting the light rays into pixels representing the associated image portion. The pixels form a panoramic digital data strip from the received image portions.

9 Claims, 8 Drawing Sheets

LOW-PROFILE HORIZON-SAMPLING LIGHT SENSOR

RELATED APPLICATIONS

This application is related to co-pending applications Ser. No. 08/364,160 (Attorney Docket No. 93E7601 US), entitled "Method and Apparatus for Automatically Tracking the Location of Vehicles", filed on Dec. 27, 1994; application Ser. No. 08/364,879 (Attorney Docket No. 94E7541), entitled "Omnidirectional Visual Sensor and Processor", filed on Dec. 27, 1994; and application Ser. No. 08/364,880 (Attorney Docket No. 94E7617, entitled "Visual Incremental Turn Detector", filed on Dec. 27, 1994. The teachings of the co-pending applications are incorporated herein by reference to the extent they not do conflict with the teachings herein.

FIELD OF THE INVENTION

The present invention is generally related to location and navigational systems for vehicles, and more particularly to visual image detectors for use in such systems.

BACKGROUND OF THE INVENTION

The use of omnidirectional vision navigation systems for providing video or visual image information useful in robot navigation, or for the location of mobile systems, is known in the art. For example, Zhongfei Zhang, Richard Weiss, and Edward M. Riseman, presented a paper on Apr. 3, 1991, entitled "Segment-Based Matching for Visual Navigation", *Computer Information Science Department, University of Massachusetts,* Amherst, Mass., "COINS PR91-35". The paper teaches the use of a reflecting globe or spherical mirror, mounted on top of a mobile robot above a camera. The camera converts the picture received to a 360° video image of the surrounding environment. The video image from the camera is processed for obtaining a fixed set of target locations for permitting a robot to navigate between desired locations by carrying out a sequence of homing tasks relative to the target locations. The 360° view taken at a given time is condensed into a 1-dimensional location signature. Correlation techniques are used for providing matching between location signatures in navigating the robot. The location signature represented by three types of segments identified as increasing, decreasing, and constant, respectively. In the system, a "horizon circle" is superimposed upon the 360° image for taking a sample of the image every degree. The "horizon circle" forms a circle band composed of 360 ticks. The circle is designated as being the actual horizon circle, with each tick being a sample thereof, as a function of the azimuth orientation. The resultant sequences of linear segments obtained are not all used for matching, whereby selective ones are obtained for providing "characteristic features" for matching between images, and navigating a robot to move from one image location to a next, in a successive manner. Each 360° video image is processed using a spherical coordinate system centered upon the origin of the image plane. The "characteristic features" chosen for matching are those which appear to be most distinctive and reliable for such use, for example parts of the processed waveform having a large slope for feature transition.

Another paper by Sung Jun Oh and Ernest L. Hall, entitled "A Study of the Characteristics of a Omnidirectional Vision Sensor", published in SPIE, Volume 804 of *Advances and Image Processing* in 1987, on pages 259 through 267. The detector of the system includes a fish eye lens mounted over a video camera, for projecting a 360° image of its surroundings. The video camera consists of a CCD or charge couple device camera for providing a video signal representative of the 360° image to an image processing system.

Another known system for providing route recognition in robot navigation includes the use of a rotating slit in combination with a video camera for providing a video image band representative of a panoramic view of the environment a robot is to navigate. As the rotating slit camera apparatus is moved linearly the panoramic view changes. Successive 2D panoramic image strips are connected together for providing a continuous panoramic view relative to a robot moving through the chosen environment. The images are processed through use of circular dynamic programming to obtain vertical line segments from the images for use in matching techniques for guiding the robot's movement. The robot's signal processor compares its present panoramic view with recorded panoramic views in order to determine the robot's heading, and correct the same if it is off course. See J. Y. Zheng and S. Tsuji, "Panoramic Representation for Route Recognition by a Mobile Robot", *International Journal of Computer Vision,* Volume 9:1, pages 55–76 (1992), Kluwer Academic Publishers, The Netherlands.

Present research for obtaining video information useful in route recognition for robot navigation, and for vehicle locator systems, is centered upon simplifying such systems while retaining reliable pattern matching. It is important that the amount of video image data necessary for reliable pattern matching be reduced to a minimum in order to reduce the size of the computer memories required by the associated systems.

SUMMARY OF THE INVENTION

An object to this invention is to provide an improved method and apparatus for obtaining strips of video or visual image information.

Another object of the invention is to provide an improved method and apparatus for compressing image data from a visual image strip extractor, while retaining sufficient data for reliable operation.

Another object of the invention is to provide an improved method and apparatus for obtaining compressed image data representative of an omnidirectional view of scenery about the sensor, for applying the data for use with navigational algorithms.

With the problems of the prior art in mind, an omnidirectional visual image detector is provided by an disk ommatidia including a plurality of spaced apart lenses about its circumferential edge for focusing light rays received from a portion of surrounding scenery into associated radially oriented and spaced apart capsules, respectively, wherein the associated focussed light rays are passed to means for directing the rays upon respective photosensor array means located radially inward within the associated capsules, for converting the light rays into groups of analog signals representing pixels of successive radial image portions of the surrounding scenery. Digital signal processing means passes the data through an A/D converter, and forms a digital strip from the visual data extracted from the pixel locations, for transfer to a computer for use with navigational algorithms or vehicle locator algorithms, or other processing.

BRIEF DESCRIPTION OF THE DRAWINGS

Various embodiments of the present invention are described in detail below with reference to the accompanying drawings, in which like items are identified by the same reference designation, wherein.

DETAILED DESCRIPTION OF THE INVENTION

Figure 1:
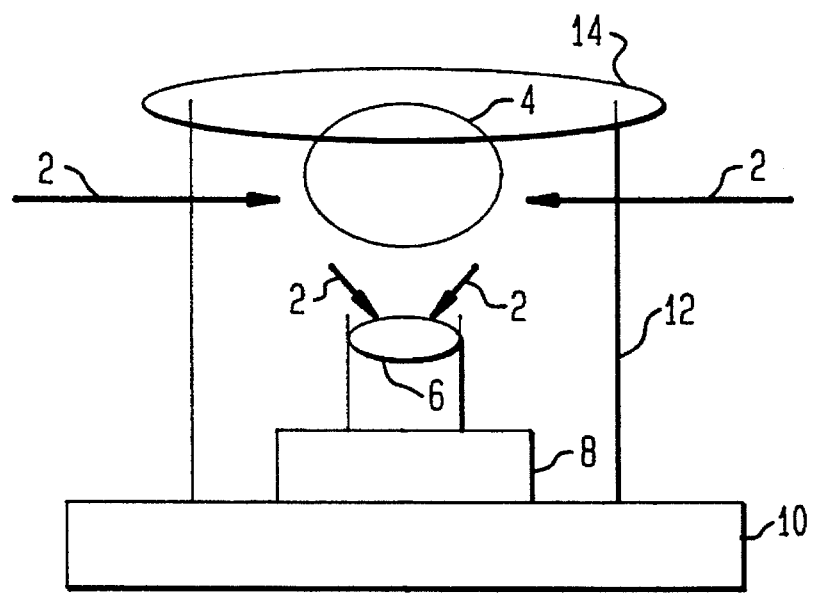
FIG. 1 is a simplified pictorial representation of one embodiment of the invention.

As shown in the simplified pictorial illustration of FIG. 1, in one embodiment of the invention up to a 360° panoramic picture of the horizontal surroundings of an object at a given elevation is obtained by reflecting light rays 2 from the surroundings off of a reflective spherical or cone-shaped reflective means 4, in this example. The resultant 360° image is reflected through a focusing lens 6 to a camera or visual image detection means 8 mounted on a base member 10. A protective housing 12 encloses the apparatus, whereby the housing 12 has sufficient transparent areas or windows for permitting necessary light to travel to the reflective means 4. The reflective means 4 may be rigidly mounted to the top 14 of the housing 12. More specifically, in an engineering prototype of the invention, the housing 12 is transparent, at least above the lens 6 in the area surrounding the reflective means 4. In this example, the reflective means 4 is a hemisphere having a reflecting coating, such as a mirrored coating. Both the lens 6 and the reflective hemisphere 4 can consist of injection molded plastic material. In this example, a charge coupled device (CCD) optical detector array chip 16 is rigidly mounted below the other side of lens 6 away from the reflective hemisphere 4, for receiving reflective images therefrom. CCD 16 converts the reflected image into an electrical signal representative of the video image. The CCD chip 16 is mounted on a printed circuit (PC) board 18. Also mounted on the PC board 18 is a video signal processing chip 20, as shown. The inventors believe that the length $L_1$ of a practical strip extractor device from FIG. 2 can be as small as six centimeters. However, depending upon the application, larger or even smaller such devices may be required.

Figure 3:
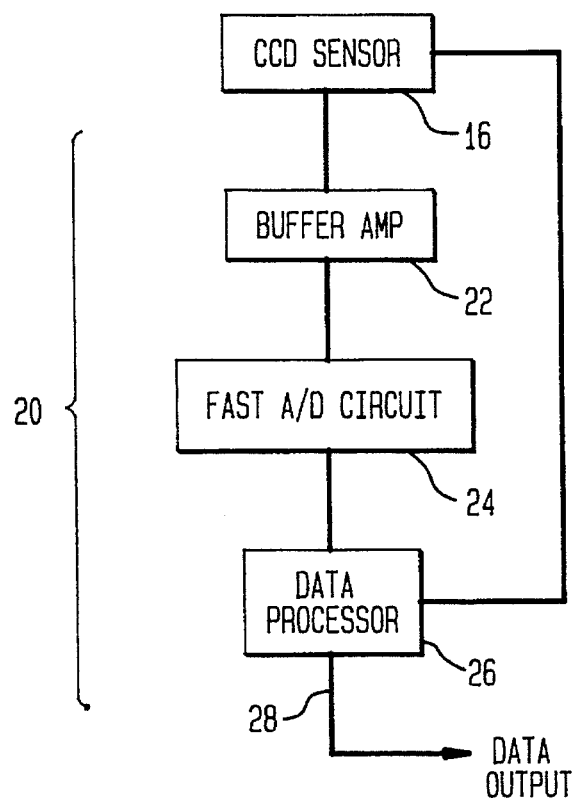
FIG. 3 is a simplified block schematic diagram of an embodiment of the invention.
Figure 4A:
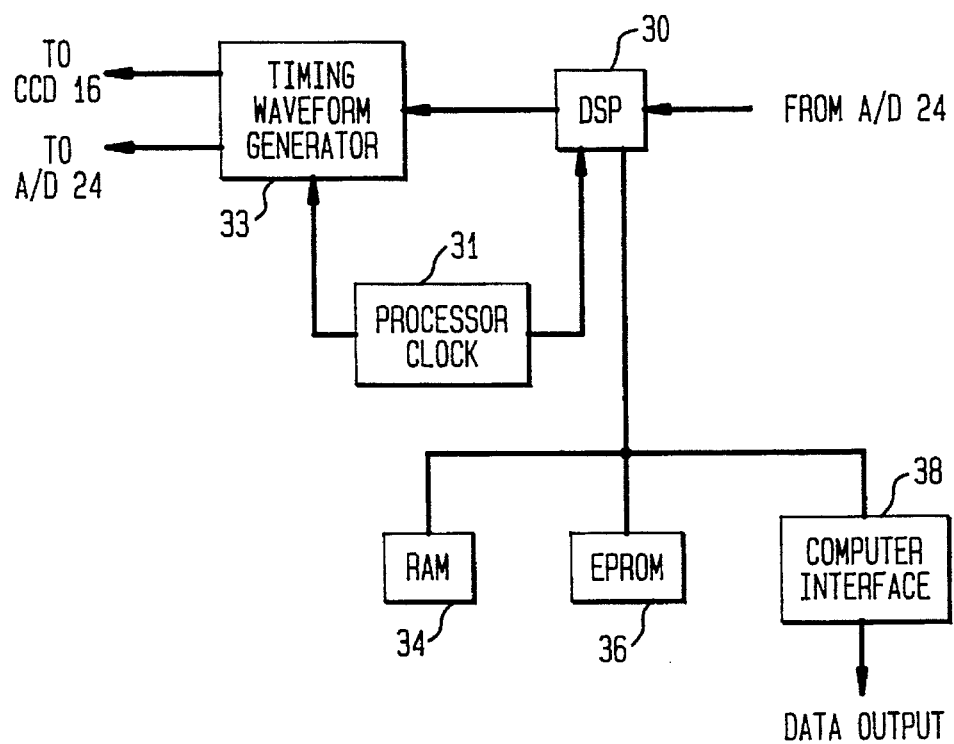
FIG. 4A is a block schematic diagram of the data processor of FIG. 3.
Figure 4B:
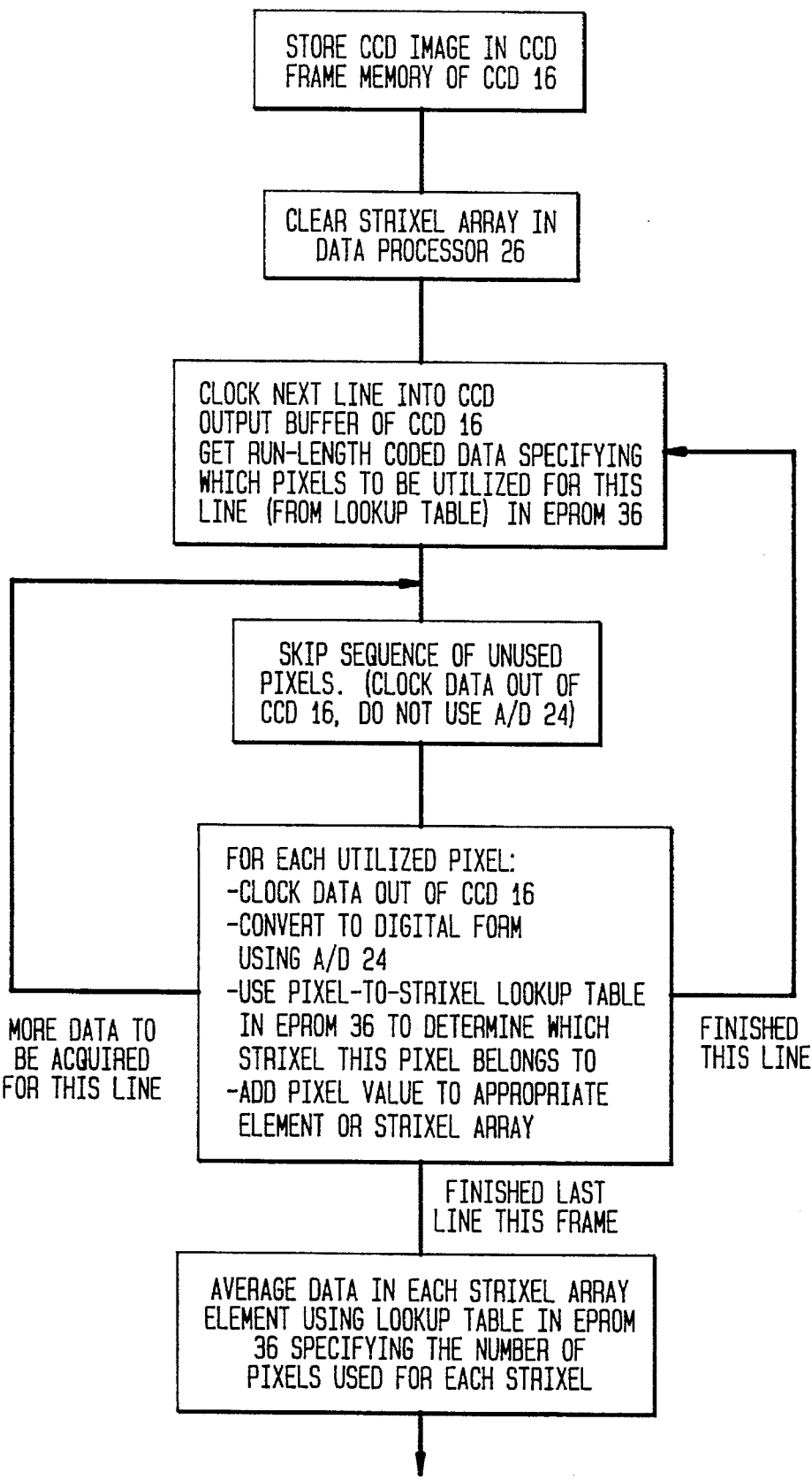
FIG. 4B is a flowchart for one embodiment of the invention, showing the operation of the data processor of FIG. 4A.

With reference to FIGS. 3, 4A and 4B, the basic electronics for one embodiment of the invention will now be described. The CCD sensor 16 is connected through a buffer amplifier 22 to a fast analog-to-digital A/D circuit 24 for converting the image information from an analog signal to a digital signal, for processing by a data processor 26. The data output from data processor 26 is connected by a bus 28 to a central processor unit CPU (not shown), for example, for use with algorithms to determine navigational parameters and controls for both indoor and outdoor vehicles, such as robots, or for vehicle locator systems.

A block diagram of the data processor 26 is shown in FIG. 4A, and includes a digital signal processor chip (DSP) 30, a processor clock 31, a timing waveform generator 33, a random access memory (RAM) 34, an erasable programmable read only memory (EPROM) 36, and a computer interface 38. In an engineering prototype for one embodiment of the invention, the various components used will now be identified via part number and manufacture, where applicable. The CCD sensor 16 consists of an approximately ⅓ inch CCD sensor or array, Part No. TC2XX FAMILY, manufactured by Texas Instruments, Inc., Houston, Tex., for example. Note that the TC2XX requires a TMC clock driver manufactured by Texas Instruments, Inc. The focusing lens 6 is typically provided by a convex lens of appropriate focal length. The reflective hemisphere 4 is 1.25 inches in diameter. The approximate distance between the lens 6 and the bottom of the hemisphere 4 is about 0.75 inch. The hemisphere 4 is rigidly mounted in the center of a 2.5 inch diameter disk 14. The cylindrical housing 12, in this example, consists of Lexan®. Lexan® is used because it exhibits less distortion then polystyrene, for example, of surrounding light passing therethrough to the hemisphere 4.

The buffer amplifier 22 can be provided by any integrated circuit providing appropriate impedance matching, level shifting and scaling of pixel data, between CCD 16 and A/D 24. The A/D 24 may be provided by a Part No. MP87XX FAMILY, manufactured by MicroPower Systems, Santa Clara, Calif. The digital signal processor chip (DSP) 30 is provided by a Part No. TMS320C3X/4X/5X, manufactured by Texas Instruments, Inc., Houston, Tex. The RAM 34 may be an integrated circuit Part No. Cy7CXXX FAMILY, manufactured by Cypress Semiconductor, San Jose, Calif. The EPROM 36 may be an integrated circuit Part No. TMS27CXX FAMILY, manufactured by Texas Instruments, Inc. The computer interface 38 can be provided by an appropriate driver, or buffer amplifier, or communications IC, for transferring image data to the computer 58. Also, a typical regulated power supply (not shown), for supplying DC voltages, can be used.

Operation of various embodiments the present invention will now be described in greater detail.

Figure 2:
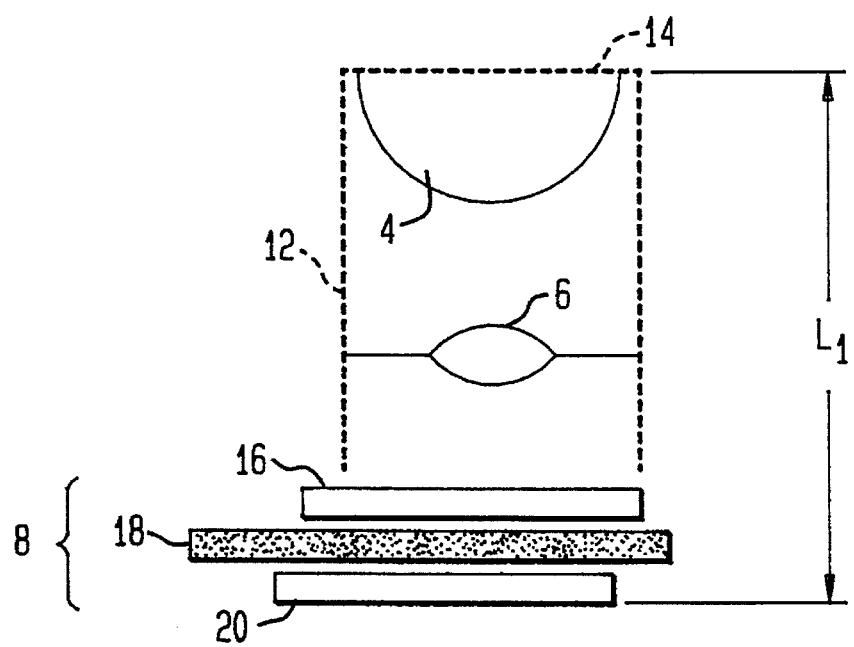
FIG. 2 is a pictorial representation of components used in an engineering prototype of one embodiment of the invention.

The omnidirectional video detector of FIG. 2 can be oriented as shown with the hemispherical reflective ball 4 pointed upward, for permitting the assembly to be installed on top of a vehicle, to provide strip mapping of the total surroundings about the vehicle as it is driven over a selected route. Alternatively, the assembly of FIG. 2 can be placed inside of a vehicle by orienting the assembly so that the hemisphere 4 is pointing downward, to also provide the strip mapping.

Figure 5:
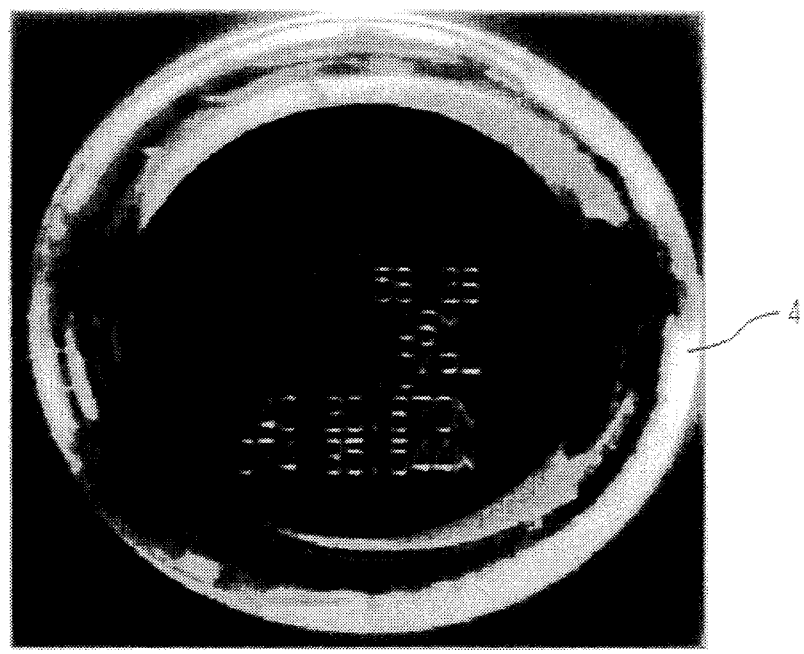
FIG. 5 is a photograph of a sample image from a video camera or visual image detector associated with the embodiment of the invention of FIG. 2.
Figure 6:
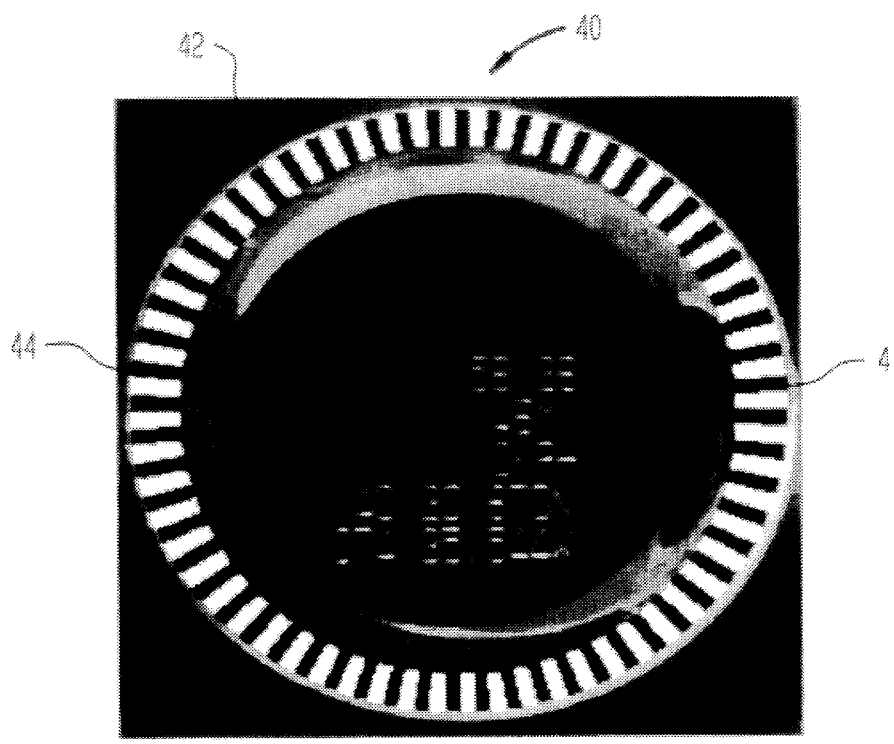
FIG. 6 illustrates a circular band of pixel locations extracted from the image of FIG. 5, for effectively compressing the video or image data representative of a 360° picture of a vehicles or robots horizontal surroundings at a given elevation and location.

Assume that the detector assembly of FIG. 2 is mounted vertically, whereby the reflective hemisphere 4 is positioned for receiving up to a 360° panoramic picture of its horizontal surroundings at a given elevation. The images from the reflective hemisphere 4, in this example, are reflected through lens 6 for focusing on the CCD array 16. A sample of an image so projected is shown in FIG. 5, looking upward from the lens 6 at the reflective hemisphere 4. The CCD array 16 converts the light images into a video information signal or "pixel information". Note that the horizontal view of the surroundings reflected from hemisphere 4, as shown, are represented by a circle of information appearing on the image plane. The width of the circle is dependent on the elevation and amount of horizontal picture required for the particular application. The resultant video or image ring 40, as shown in FIG. 6, is mapped to pixel locations represented by the alternating white 42 and black 44 radial segments of video or image ring 40. Note that the image information of ring 40 is divided into equal radial segments, with each segment representing a certain angular displacement from the front of the picture.

Figure 7:
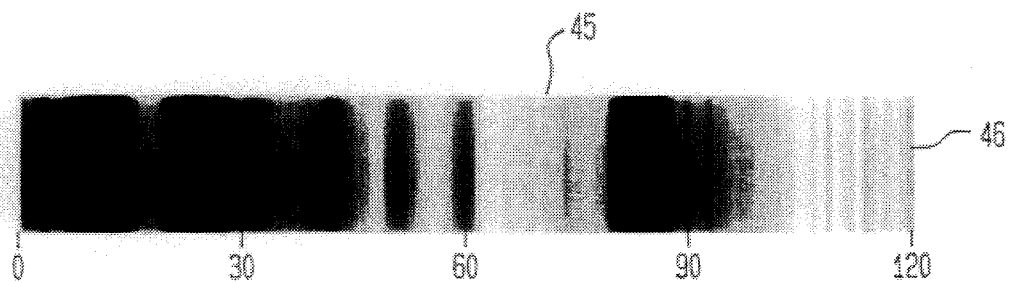
FIG. 7 shows an example of a strip of 120 pixel locations extracted from the 360° picture or image of FIGS. 5 and 6.

With reference to FIG. 3, the image information from CCD sensor array 16 is passed through a CCD driver circuit and buffer amplifier 22 to the fast A/D converter circuit 24 (three may be required for color), for converting the information from an analog signal into digital signals. The digitized image information is then processed by the data processor 26 for extracting digital data representing the relative intensities of the pixel locations within the image ring 40. All other video information not within image ring 40 is discarded, resulting in a compression of the image data. An example of a data strip extracted from the pixel locations of video ring 40 is shown in FIG. 7. The extracted data represents the relative intensity (contrast) of light at each of the 120 pixel locations, in this example. The strip extraction process is described in greater detail below.

With further reference to FIGS. 3, 4A, and 4B, operation of the data processor 26 will now be described. The CCD sensor array 16 converts the pictorial information into "pixel form", which is temporarily stored therein, and clocked out via a control signal generated under program control within the DSP 30 for conversion to digital form by the A/D converter circuit 24. A second control signal is used to initiate the A/D 24 digitization. The A/D 24 control signal is either generated under program control within the Digital Signal Processor (DSP) 30, or by digital logic which provides a sufficient delay from a pixel clock signal to allow the analog pixel data time to settle to the desired accuracy before initiation of the A/D 24 digitization. The digitized pixel data from A/D 24 is then either stored, under program control from within the DSP 30 to an internal RAM storage area of DSP 30, or external RAM 34 storage attached directly to the DSP 30 external address, data and control busses, for example. The digitized pixel information from the A/D converter circuit 24 so transferred into a random access memory (RAM) will be further processed by the digital signal processor 30.

Computer programs for operating the digital signal processor 32 are stored in a EPROM 36. The DSP 30 is programmed to extract the digitized image information from CCD 16, and process it for obtaining the "strip" of values extracted from the bins of pixels 42 and 44 of video ring 40. As a result of the processing by the digital signal processor 30, the angular image segments 42 and 44 are placed linearly and successively side by side for producing the strip information shown in FIG. 7. Each "bin" value is provided as an individual stripe 45 of respective successive stripes 45 of strip 46. In the next step, the digital signal processor 30 is programmed to pass the image information strip to the computer interface circuit 38, for providing the same as a data output signal to a computer or central processing unit, for utilization for vehicle navigation or locating purposes.

The DSP 30 is programmed for averaging all of the pixels in each of the alternating and successive bins of pixels 42 and 44 of the image ring 40. The DSP 30 is also programmed for outputting only information associated with these more limited data points or "bins" instead of the 78,408 points that typically are provided from a video camera or CCD array 16 after a predetermined period of time in milliseconds.

Note that in another embodiment of the invention the DSP 30 includes the RAM 34 and EPROM 36 on a single integrated circuit chip. However, depending upon the application, additional RAM 34 and EPROM 36 may be required off chip.

Operation of an embodiment of the invention for FIGS. 3, 4A, and 4B will now be described. The DSP 30, acting as a high-speed controller, controls the operation and acquisition of image data from the CCD 16. A processor clock 31 supplies the fundamental timing signal for operation of the DSP 30. The DSP 30 controls both the integration (exposure) time of the CCD 16 and the latter's internal frame storage, and also controls the readout of line and pixel data from the CCD 16 for each frame. The A/D 24 samples and converts the analog pixel data to digital form. The A/D 24 timing is either controlled directly from the DSP 30, or by a small amount of additional logic such as timing waveform generation circuitry 33, so that it is properly synchronized with a pixel data readout clock pulse (not shown). The DSP 30 can directly control the operation of the CCD 16 since it is not required that the CCD 16 operate with a fixed (non-varying) timing for exposure time and internal image storage and readout. Since DSP 30 generates clock signals using program loops, the timing of these signals is not exactly uniform. This scheme eliminates the necessity of circuitry to synchronize and acquire digital data from an imaging subsystem which uses internal clocks. As a result, this allows the DSP 30 to dynamically control the transfer of pixels between CCD 16 and A/D 24, and A/D 24 and DSP 30. This scheme also eliminates the need for clock generation circuitry to control the CCD 16 and A/D 24, and the need for synchronization of the DSP 30 with the A/D 24. This increases efficiency in several ways:

DSP 30 resources do not need to be spent on synchronization or interrupt servicing.

The DSP 30 can spend a variable amount of time to process data from each pixel, since it can control the timing of the acquisition of each pixel. This means that blocks of image data can be compressed as they are acquired, instead of storing the entire image in RAM 34 first.

A lower-cost A/D converter 24 can be used to achieve a specified frame rate, since all of the pixel data on each line is not used, and does not need to be converted to digital form. In the preferred embodiment, unneeded pixels are discarded by clocking them out of the CCD 16 at a relatively high rate in comparison with the conversion time of the low-cost A/D 24; the A/D converter 24 is not as a result burdened with digitizing these sequences of unneeded pixels. Unneeded pixels at the end of each line are discarded by clearing the CCD 16 output buffer (not shown) when the last needed pixel from each line has been digitized.

Unused lines at the top and bottom of each frame can be discarded by clocking unused sequences of lines into the CCD's 16 output buffer, followed by a clear operation on the output buffer.

For a given CCD 16 and A/D 24, the frame rate can be increased beyond the limits that would be obtained using the previous description of the data acquisition procedure, if some loss in vertical resolution can be tolerated in a given application. In this operating mode, the DSP 30 will clock groups (sequences) of lines into the CCD 16 output buffer without clocking pixel data out of the output buffer. In this mode, the charge representing analog pixel data from each vertical column in a line group will be summed in the associated output buffer pixel charge storage element of the CCD 16. The DSP 30 can then acquire the CCD 16 output buffer pixel data which is in the form of a single line representing the vertical summation of a group of lines. The advantage of the use of the DSP 30 to achieve this mode of video data acquisition also allows further flexibility in the vertical segmentation of the frame into groups of lines for efficiency in subsequent processing. The number of lines in each group of lines need not be identical throughout a frame. This can be used to advantage in two ways:

The smearing of video or image data across strixels (a strixel is the average of all pixels in a bin i) can be held approximately constant by using a variable number of lines per group. In this case, relatively more lines are assigned to groups for which the strixels are primarily oriented in either a horizontal or vertical direction, and relatively fewer lines are assigned to groups in regions which contribute to pixels which are primarily at either 45°, 135°, 225°, or 315°.

For a given exposure time and a given A/D 24 resolution, it may be desirable to accumulate charge across sequences of lines in regions of the image with low light levels. The dynamic range of portions of an image with low light levels (that produce CCD pixel output voltages which are close to the optical black output voltage of the CCD 16) will be quantized relatively coarsely in comparison to regions of the image with higher light levels. In this case, a reduction in vertical resolution in low-light regions of the image may be more than compensated for by improved resolution of the light levels in these portions of the image with a resultant increase in utility of this data to the algorithm. This mode of operation will be more efficient when the change in the image from frame to frame is small enough for good prediction of the light levels in segments of the next frame to be made based on the image in the current and previous frames.

The exposure time for each frame can be controlled dynamically, on a frame-by-frame basis, in order to optimize performance of the overall system. For any data from any given frame, it is possible that some portions of the frame are either under or overexposed, based on the dynamic range specifications of the CCD 16 and the A/D 24 coupled with variances in external lighting and the reflectances of objects in the scene. Additional data for under and overexposed regions can be acquired using the DSP 30 to change the integration time appropriately for proper acquisition of image data from these regions. After re-exposure, efficient acquisition of portions of image data can be accomplished using the previously described techniques for discarding lines and pixels.

At frame rates for which images do not change rapidly from frame-to-frame, the optimized integration times for each portion of the image can be computed from the current and previous frames for the next frame. A sequence of exposures followed by acquisition of image segments can then be used to generate a composite image without first acquiring the entire image containing portions of unusable data.

This method of acquiring data from different segments of the CCD 16 using different exposure times for each segment allows the use of either a lower-cost A/D 24, lower-cost CCD 16, or an effective increase in dynamic range for a system consisting of a given CCD 16 and A/D 24.

This method of acquiring data from different segments of the CCD 16 may also be used to increase the efficiency of the algorithm in cases where portions of the next frame image are predicted to not be useful to the algorithm, either due to light levels which are out of range of the ability of the system to resolve, or due to these portions of the surroundings contributing no useful information regarding the scene immediately surrounding the vehicle.

In order to achieve lowest overall system cost, it may be necessary to use additional RAM 34 and EPROM/PROM 36 with the DSP 30. This is based on the resolution of the CCD 16, the amount of image data that needs to be processed, the cost of the associated integrated circuits, and the amount of RAM 34 and EPROM/PROM 36 that are provided on-chip for a given DSP 30. These IC's (integrated circuits) would all be attached directly to the DSP 30 external address/data bus. A separate communications IC is not necessary, since the DSP chip 30 can also function as a communications device, although it may be useful to relieve DSP 30 of the overhead associated with the communications functions.

A range for the resolution for CCD 16 of 19,200 pixels to 307,200 pixels is believed adequate, dependent upon the application. The range of exposure time suitable for this type of sensor is from ½ sec to $1/15{,}000$ sec, which is believed to be adequate to control exposure based on lighting level, dependent upon the application, and the use of the previously described methods to extend the effective dynamic range of the imaging system.

In the above-described one embodiment of the invention, the CCD array 16 is as previously indicated a commercially available integrated circuit CCD. As such, the CCD array 16 is substantially rectangular or square, and will detect all of the image information reflected to it from the reflective hemisphere 4, whether within or outside of the image ring 40, such as the image information encircled by the image ring 40, for example. As a result of this the digital signal processor 30 must be programmed for extracting only the video information representative by the image ring 40, in this example, as described above. To accomplish this, one embodiment of the invention provides an algorithm that defines an ellipse on the reflective image. This requires the establishment of a number of key parameters, namely a center point ($C_x$, $C_y$), an inner and outer radius r and R, respectively, and an aspect ratio, α. These parameters in the below algorithm are required due to having non-square pixels in the CCD array 16 or the A/D converter 24. Each pixel (x,y) in the image then has an elevation as shown below in equation (1):

$$e(x,y) = \sqrt{(C_x - x)^2 + \left(\frac{C_y - y}{\alpha}\right)^2} \quad (1)$$

and an angle $$a(x,y) = a\tan 2\left(\frac{C_y - y}{\alpha}, C_x - x\right) \quad (2)$$

Each pixel represented by the coordinates x and y belongs to a bin i iff r<e(x,y) <R and $$360x\frac{i}{B} \leq a(x,y) < 360X\frac{(i+1)}{B},$$

where B is the number of bins extracted. Next a strixel's value for bin i is calculated as the average of all pixels in bin i. Note that this computation is an approximation, and that the reflective hemisphere 4 is not perfectly spherical, sometimes requiring a calibration step for obtaining a strip 46 (see FIG. 7) representative of strixels evenly spaced about the CCD array 16. Note also that the various constants depend upon the exact CCD array 16, hemispherical reflector 4, lens 6, and A/D converter 24. However, the present inventors use radii that typically correspond to elevations between −3° and +30°, and typically use B=120 strixels.

In an engineering prototype for the present invention, the sensor based navigation extracts the strixels in software. The C-code program steps which perform the extraction are listed below, for example. The "strip_info" structure contains the pixel to strixel mapping information determined from a two-ellipse method. For each "bin," the average intensity of the pixels in that bin is calculated as follows in C-coded steps:

```
A. /* function for strip extraction */
B. void getStrip(int size,unsigned char *data,StripPix *strip_info)
C. {
D.   register unsigned i,j,sum;
E.
F. /* this call fills the global variable image_data */
G. /* with the digitized image */
H.   getImage(size);
I.
J.   for(i=0;i<strip_info->nbins;i++) {
K.     sum=0;
L.     for(j=0;j<strip_info->bin[i].npts;j++) {
M.       sum+= (image_data[(strip_info->bin[i].pt[j].x+
N.        strip_info->bin[i].pt[j].y*image_w)]);
O.     }
P.     data[i]=(strip_info->bin[i].npts?sum/strip_info->bin[i].npts;
Q.      i>0?data[i-1]:0);
```

The above software implementation in an actual commercial product of the system will likely be more hardware oriented. This is shown in the flowchart of FIG. 4B, for another embodiment of the invention.

Figure 8:
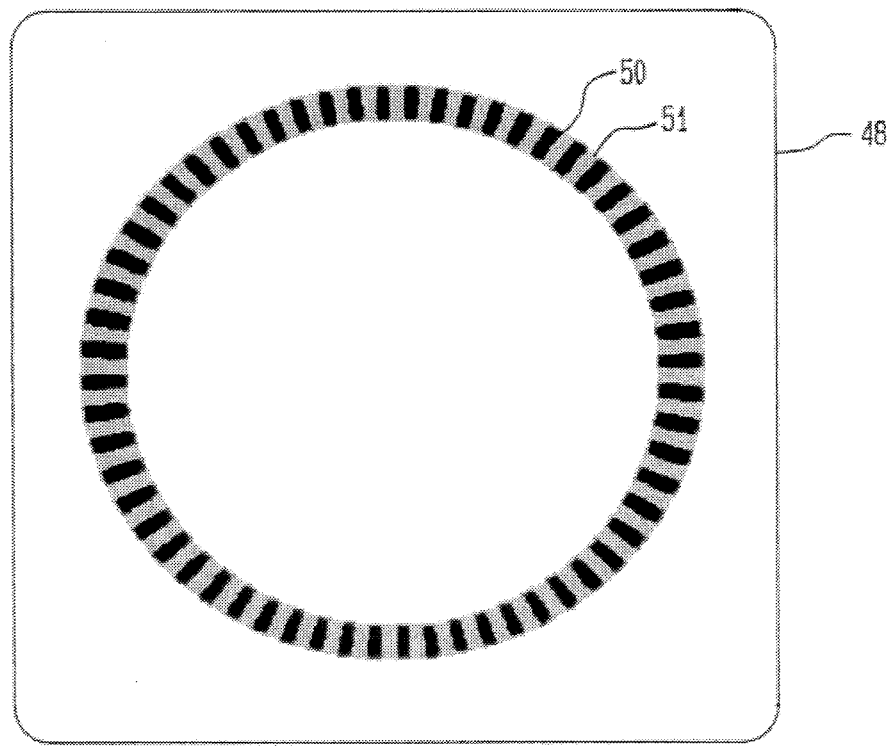
FIG. 8 is a simplified pictorial view of a customized CCD array for one embodiment of the invention.

In another embodiment of the invention, the present inventors recognize that the digital signal processor 30 can be simplified or eliminated by changing the above-illustrated CCD array 16 to have a customized configuration, for detecting image information only in a ring of sensors analogous to the image ring 40 of FIG. 6A. Such a CCD array 48 is shown simplistically in FIG. 8 to have a ring 50 of successive bins 51 of CCD sensors corresponding to the alternating and successive bins of pixels 42 and 44 of image ring 40, respectively. Since a CCD array 48 as shown in FIG. 8 is not commercially available, such a device must be custom fabricated. However, the fabrication of such a CCD array 48 is well within the state-of-art of the present technology. For example, see "Electronic Engineer's Handbook", Third Edition, McGraw-Hill Book Company, pages 20–45 and 20–46. If such a CCD array 48 is employed, the DSP 30, for example, can be programmed to sequentially and successively transfer the images or pixels of bins 51 from CCD array 48, through A/D converter circuit 24, and into RAM 34 for temporary storage, or through computer interface 38 directly without first being stored. Regardless, the digitized image data from A/D converter circuit 24 is directly connected, or indirectly connected via EPROM 36, to the computer interface 38, for outputting the same to a CPU or computer, as previously indicated.

Figure 9:
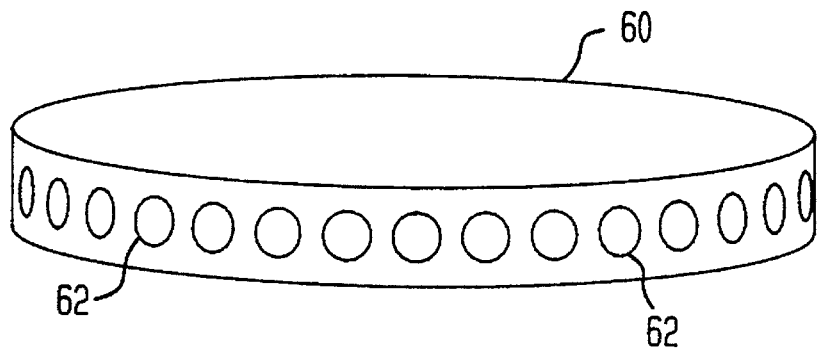
FIG. 9 is a pictorial view of an disk of ommatidia light sensor for another embodiment of the invention.
Figure 10:
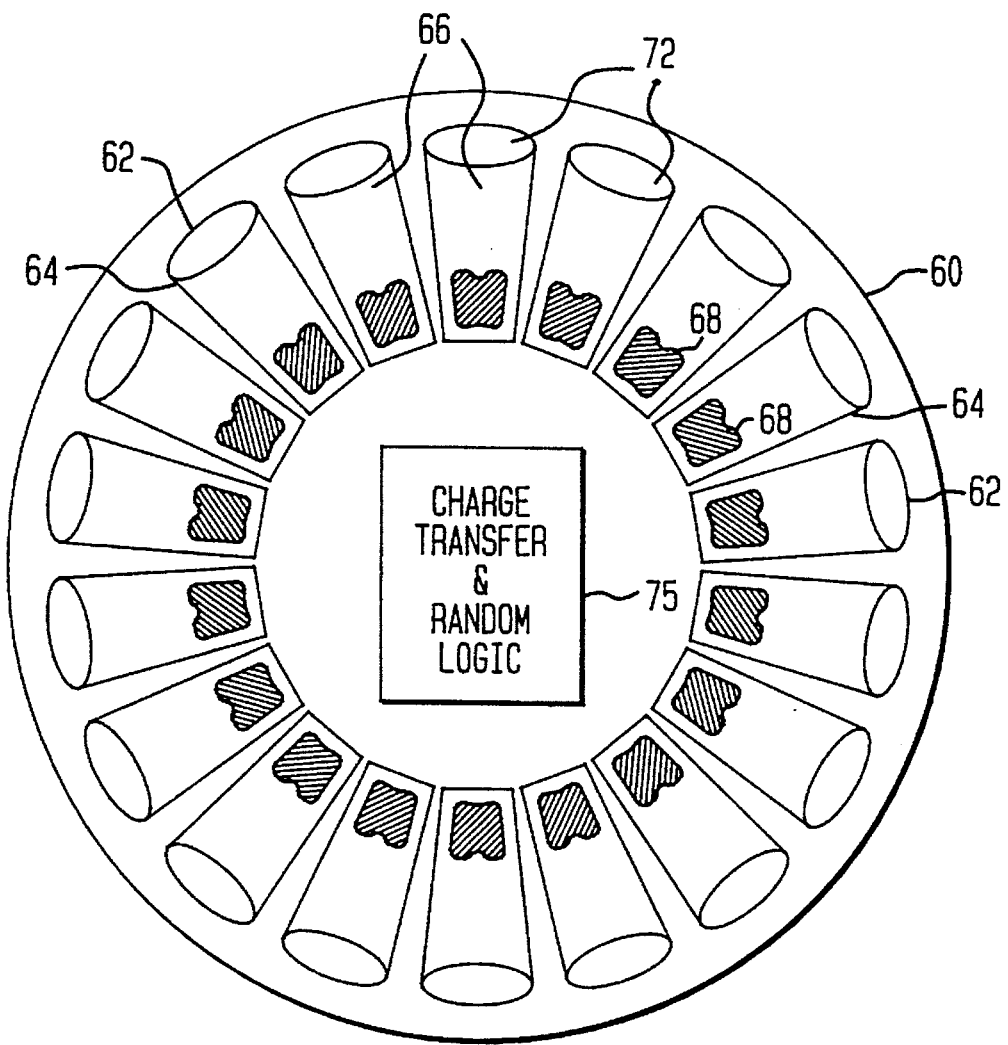
FIG. 10 is a top peel away or interior pictorial view of the disk of ommatidia of FIG. 9.
Figure 11:
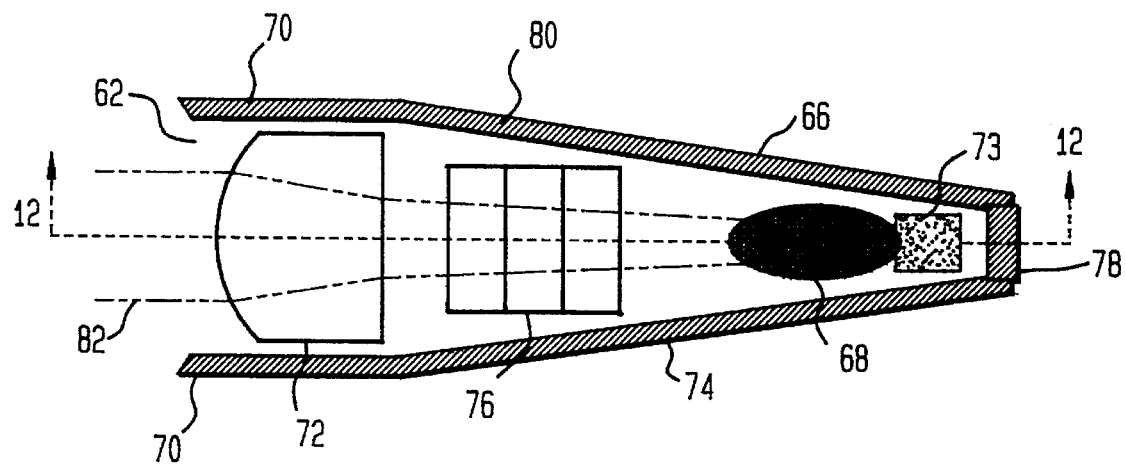
FIG. 11 is a top sectional view of one "capsule" of the disk of ommatidia of FIG. 10.

In yet another embodiment of the invention, an ultra compact image detector, as shown in FIGS. 9 and 10, was conceived as an alternative to the image detectors of FIGS. 1 and 2. More specifically, the alternative image detector is in the form of an disk of ommatidia or discoidal detector 60 that includes a plurality of successive windows or holes 62, in this example, around the circumferential edge or side of the disk 60. The holes 62 each extend radially inward to a centermost portion of the interior of the disk 60, and although shown as being circular in this example, can be otherwise shaped. Each hole 62 has inwardly converging sidewalls 64, as shown in FIG. 10, for forming a plurality of capsules 66. Each of the capsules 66 act as a waveguide for light entering an associated hole 62. For purposes of simplicity in the illustration in FIG. 10, the capsules 66 are shown as being wedge or cone shaped. However, as shown in FIG. 11 for a lateral cross section of a capsule 66, the frontmost wall portions 70 are parallel for providing a circular section for housing a lens 72. The circular section 70 of each capsule 66 is joined to a cone shaped rear most portion of the associated capsule 66 formed by radially inward tapering for converging wall portions 74. In one embodiment of the configuration for the disk of ommatidia 60, a prism 76 is mounted within the frontmost portion of the cone shaped section 74 to bend the light onto photosensor 68. A photosensor array 68 is provided by a plurality of any suitable known photosensing devices such as a photodiodes, charge couple devices (CCD), phototransistors, and so forth. Each photosensor or photosensor array 68 serves to detect a large pixel or a bin of pixels, respectively, representative of one portion of a panoramic strip of surrounding scenery. Charge transfer devices 73, and A/D converters and random logic 75 sample the output of the photosensor, perform initial processing, and hold the data for transfer to the next stage of the system. The walls 70, 74, including an innermost end wall 78, together provide optic light baffles 80 for the capsule 66, for preventing light rays 82 entering the capsule 66 through opening 62 from escaping from the capsule 66. In this manner, light rays 82 entering a given capsule 66 are prevented from crossing into adjacent capsules 66, thereby preventing image distortion and interference from light traveling between the capsules 66. By partially eliminating the baffles 80, it may be possible to increase the light-gathering efficiency of the system, at the expense of spacial resolution.

The cross section of FIG. 11 is representative of a transverse cross section for an individual capsule 66 of the disk of ommatidia 60 of FIGS. 9 and 10. Note that the shape of the sensitive area of the photosensor array 68 may be other than the shape illustrated in the drawings.

Figure 12:
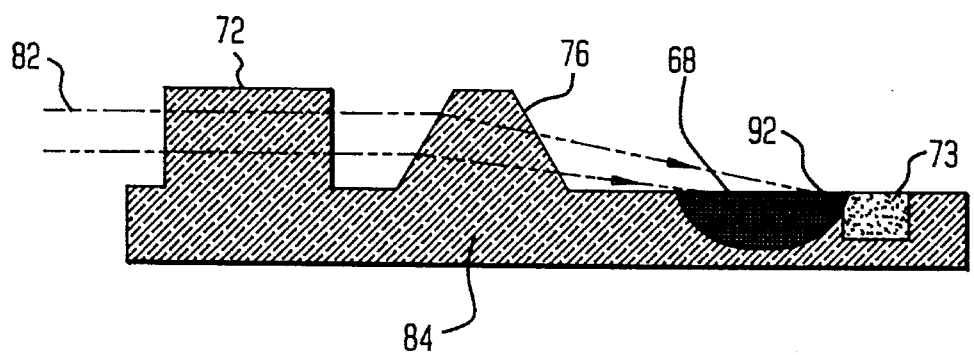
FIG. 12 is a cross sectional view taken along line 12—12 of FIG. 11.

A lateral cross section taken along line 12—12 of FIG. 11 is shown in FIG. 12, with wall portions 70, 74, and 78 not being shown for purposes of simplicity. As shown, in one embodiment the disk of ommatidia 60 is fabricated on a substrate 84, such as a silicon substrate. Through use of known integrated circuit fabrication techniques, including etching, photomasking, epitaxial growth, and/or diffusion, for example, the lenses 72 prisms 76, and photosensor arrays 78 are formed on substrate 84. In this manner, the ommatidia disk 60 can be miniaturized. Otherwise, on a larger scale, the disk of ommatidia 60 can be provided from discrete components.

Figure 13:
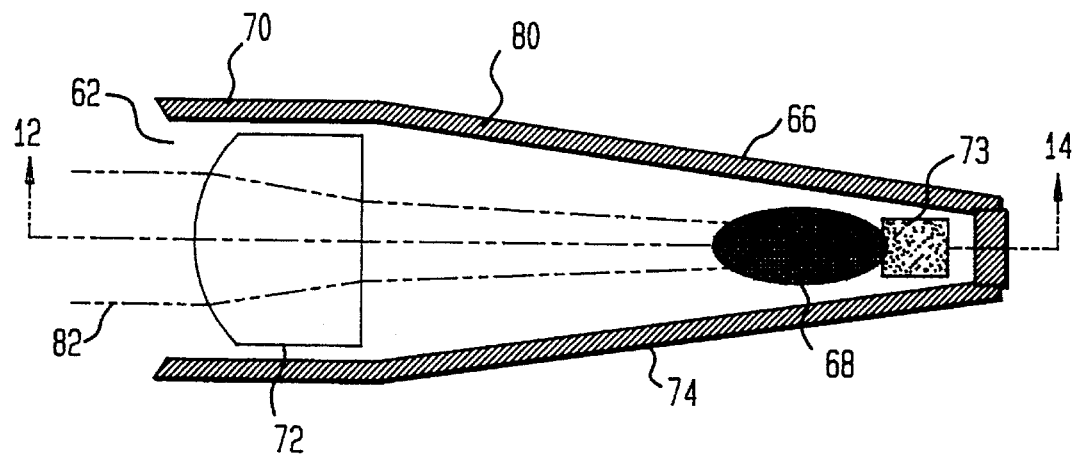
FIG. 13 is a top sectional view of an alternative embodiment for the capsules of the disk of ommatidia of FIG. 10.
Figure 14:
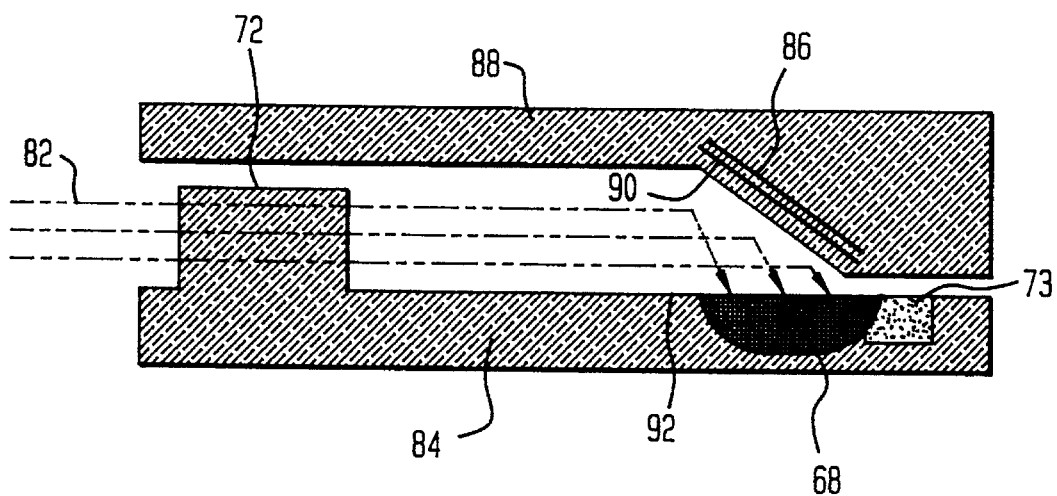
FIG. 14 is cross sectional view telecon along line 14—14 of FIG. 13.

In another embodiment of the invention, as shown in a transverse cross section of a capsule 66 in FIG. 13, and the cross section thereof taking along 14—14, as shown in FIG. 14, the prism 76 of the embodiment of FIGS. 11 and 12 is replaced by a reflecting mirror 86. The substrate 84 for the embodiments of FIGS. 11 and 12, and FIGS. 13 and 14, includes bottom portions of the capsules 66 formed therein. A cover substrate 88, as shown in FIG. 14, includes top portions of capsules 66 formed therein, in this example. In the embodiment of FIG. 14, the cover substrate 88 is fabricated to also include the mirror 86 on a mirrored sloped portion 90 thereof. An appropriately shaped similar cover substrate 88, without the mirror 86, is used for providing the top portions of the capsules 66 of the embodiment of FIGS. 11 and 12, but is not shown for purposes of simplicity. The disk of ommatidia 60 can be oriented in any plane as desired, for providing a 360° panoramic image of its surroundings, in this example. The number of capsules 66 employed in a given disk of ommatidia 60 can be increased or decreased depending on the desired resolution. Also, if less than a 360° panoramic image is required in a given application, only a required section of an disk of ommatidia 60 may be employed, such as an appropriate pie shaped section thereof.

In operation, for an disk of ommatidia 60 incorporating the embodiment of FIGS. 11 and 12, light rays 82 enter through associated opening 62 of a capsule 66, travel through convex lens 72, which converges the light in the transverse plane in this example, and directs the light rays 82 upon prism 76. The prism 76 then directs the light rays 82 laterally downward, all for focusing the light rays 82 onto the light sensitive area 92 of the associated photosensor array 68. As is known, the photosensor array 68 converts the light rays 82 into an electrical signals, which are processed as previously described. In the embodiment of FIGS. 13 and 14, for each capsule 66, the light rays 82 focused by lens 72 are reflected by mirror 86 onto the light sensitive surface 92 of photosensor array 68.

In broad terms, the disk of ommatidia 60 comprises a radial array of capsules 66 lying in a common plane, each of which includes means for focusing light rays 82 entering through an associated opening 62 thereof onto an associated photosensor array 68. The light rays so detected are representative of a portion or bin of pixels of an image surrounding the disk of ommatidia 60. The image portion gathered by each one of the capsules 66 is dependent upon the associated field of view of each of the individual capsules 66. As a result, the composite of the images detected by successive capsules 66 provide a horizontal band or panoramic strip of the scenery about the disk 60.

In another embodiment a color CCD or color video camera means or color image detector 8 is used. Color is typically represented with three values. In most color cameras these values determine the amount of red, the amount of green and the amount of blue at each point, or pixel in the image. Such a system is called RGB for red/green/blue. The RGB values for each pixel provide three times as much information as the single value associated with intensity that is produced by gray-scale (also called black and white) cameras.

When regular strips 46 are detected, as previously described, the average intensity within each bin 42, 44, for example, of the annulus is recorded. However, when a color video camera or image detector means is used, the ability to record color information about each bin of pixels in addition to the average intensity level is obtained. In this case, for each bin an RGB value is detected and recorded, yielding a color strip 46 of successive color stripes 45.

These color stripes 45 may be more useful than the intensity-only ones. Color is a highly distinctive feature that may be used for distinguishing between strips 46. Two strips 46 may look the same in the intensity band and yet look very different when color is considered. This is because many different color values will be mapped to the same intensity value. Thus color provides the chance of greater distinctiveness between the individual stripes 45 when comparing two strips 46 for similarity, for example, thereby enhancing the accuracy of determining whether two strips 46 correspond to the same location.

This distinctiveness may be useful in recognizing locations in the world, giving greater accuracy in determining the position of a vehicle, in a vehicle locator system, for example, where color is not used, two distinct locations may have similar dark stripes 46 when only shades of gray are employed. However, when color is considered, it could be the case that the coloration of one strip 46 (e.g. the colors of its successive stripes 45 or bins 42, 44) is different than the coloration of the other strip 46 being compared thereto. When color is considered, the stripes 45 are seen as clearly distinct, and a vehicle locator or tracking system, for example, employing the present invention can easily determine which strip 46 more closely corresponds to the current position of an associated vehicle.

Another way in which the use of color may aid automatic vehicle location, for one application example, is in computing the degree of rotation via a visual incremental turn detector. Such a detector operates by comparing the current strip 46 with all possible rotations of the previous strip 46 recorded along a road for an adjacent image or target, to see which one gives the best match. The best match is considered to give the most probably degrees of rotation, e.g., for a vehicle turning a corner. More sophisticated and efficient techniques might also be used to obtain sub-pixel resoltuion, as in standard egomotion calculation algorithms in computer vision.

The use of color may aid in determining the best rotation match. For example, a current strip 46 may have a fairly close match to more than the possible rotation of the previous strip 46. When color is considered, the possible matches between the strips 46 may become more distinctive, and the correct match becomes obvious.

There is more than one method to calculate the color values in the strips 46. One way is to determine the average color in each bin 42, 44. This is similar to the way intensity strips are computed. The red value for each bin is computed as the average of all the red components of the pixels in that bin. The green value is the average of all the green components of the pixels, and similarly for the blue.

A second method for calculating the color values in the strips 46, is to assign the brightest pixel in each bin as being representative of that bin. Each pixel in that bin is examined to determine which one is the brightest and the value of that pixel becomes the value associated with the bin. The brightness is computed as simply the average of the red, green, and blue values of each pixel.

A third method for calculating the color values in the strips 46 is to determine which pixel in each bin is the "most colorful", and assign that value as representative of the bin. "Most colorful" is determined as being the furthest from medium gray by Euclidean distance measure. Medium gray is considered to have the RGB value of (127, 127, 127). The color distance C may be expressed as follows:

$$C = \sqrt{(R-127)^2 + (G-127)^2 + (B-127)^2} \qquad (3)$$

where R, G, and B are the actual values for red, green, and blue.

A fourth method for calculating the color values in the strips 46 is to determine which pixel has the best combination of brightness and difference from gray. The pixel in each bin with the best score is assigned as the characteristic value of that bin. The score S is calculated as follows:

$$S = \sqrt{(R-A)^2 + (G-A)^2 + (B-A)^2} + \sqrt{R^2 + G^2 + B^2} \quad (4)$$

where A is the average of the RGB values of the pixel computed as follows:

$$A = \frac{R + G + B}{3} \quad (5)$$

A fifth method for calculating the color values in the strips 46 is to divide all possible colors into a small set of characteristic colors. Then for each bin a histogram is computed to determine how many pixels are close to each color in the set. The set color with the most pixels similar to it is considered representative of the bin. Regardless of which method is used to compute the color strips 46, the resulting color strips 46 are compared to each other by the standard distance metric to produce a degree of match. This match is used to determine position in the case of vehicle location applications, or to determine rotation in the case of the visual gyroscope applications.

Although various embodiments of the invention have been shown and described herein, they are not meant to be limiting. Those of skill in the art may recognize certain modifications to these embodiments, which modifications are meant to be covered by the spirit in scope of the appended claims. For example, rather than extracting image brightness itself in the band of interest, one might construct a mechanism that instead extracts the spatial and temporal derivatives of the brightness, or other germane local feature sets. In other words, the stripes 45 of FIG. 7 would each represent the brightness in a patch around each bin, instead of the brightness itself.

What is claimed is:

1. An omnidirectional light sensor for producing a plurality of electrical signals each representative of an image portion of a panoramic picture of associated scenery surrounding said sensor at a given elevation, said sensor comprising:

a disk-like housing including a top section and a bottom section;

a plurality of successive spaced apart individual radially directed capsules each having a frontmost opening along a circumferential edge of said disk, said capsules being formed between and within opposing portions of said top and bottom sections of said disk;

a plurality of photosensors each located radially inward in said plurality of capsules, respectively, for converting light waves from the scenery into electrical signals, the signals from each photosensor representing a bin of pixels of an associated image portion;

a plurality of lenses located in the frontmost openings of each one of said plurality of capsules respectively, for focusing light rays entering an associated said capsule;

a plurality of light ray directing means located in each one of said plurality of capsules, respectively, between an associated lens and photosensor, for directing focused light waves from the associated lens onto a light sensitive portion of the associated photosensor.

2. The omnidirectional light sensor of claim 1, wherein said plurality of light ray directing means each include a mirror positioned in its associated capsule for reflecting focussed light rays from the associated said lens onto its associated photosensor.

3. The omnidirectional light sensor of claim 1, wherein said plurality of lenses, said plurality of light directing means, and said plurality of photosensors are formed on a top portion of said bottom section of said housing opposing said top section.

4. The omnidirectional light sensor of claim 3, wherein said top and bottom sections of said housing each consist of a silicon substrate.

5. The omnidirectional light sensor of claim 3, wherein said plurality of lenses each include convex lenses.

6. The omnidirectional light sensor of claim 5, wherein said plurality of light directing means each include a prism.

7. The omnidirectional light sensor of claim 2, further includes:

said plurality of lenses and said plurality of photosensors being formed on a top portion of said bottom section of said housing opposing said top section; and said plurality of mirrors being formed on a bottom portion of said top section of said housing opposing said plurality of photosensors, respectively.

8. The omnidirectional light sensor of claim 7, wherein said plurality of mirrors are each formed on a mirrored surface at an angle relative to a horizontal plane of a light sensitive area of an associated photosensor, respectively, for maximizing the focussed light reflected upon the latter.

9. The omnidirectional light sensor of claim 1, wherein each of said plurality of capsules is configured to act as a waveguide for light entering its frontmost opening.

\* \* \* \* \*